No. 649,771. Patented May 15, 1900.
W. T. STANWORTH.
BINNACLE AND STEERING STAND.
(Application filed Feb. 26, 1900.)
(No Model.)
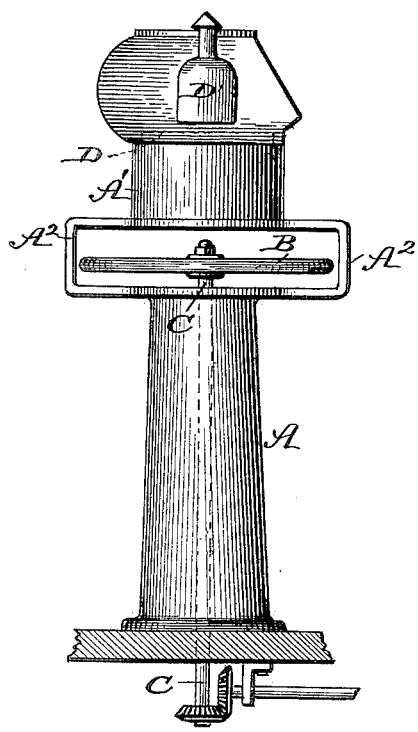
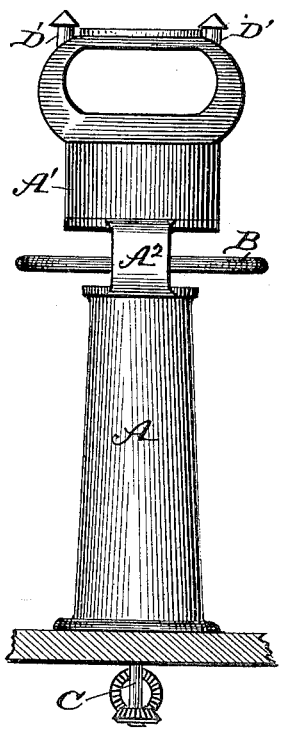
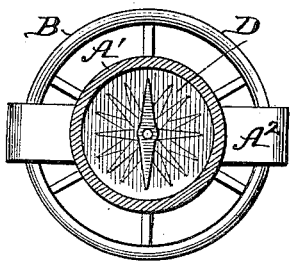
WITNESSES:
Jos. A. Ryan
Perry B. Turpin
INVENTOR
Walter T. Stanworth.
BY Munn & Co.
ATTORNEYS

UNITED STATES PATENT OFFICE.

WALTER THOMAS STANWORTH, OF NORFOLK, VIRGINIA.

BINNACLE AND STEERING STAND.

SPECIFICATION forming part of Letters Patent No. 649,771, dated May 15, 1900.

Application filed February 26, 1900. Serial No. 6,567. (No model.)

*To all whom it may concern:*

Be it known that I, WALTER THOMAS STANWORTH, residing at Norfolk, in the county of Norfolk and State of Virginia, have made certain new and useful Improvements in Binnacle and Steering Stands, of which the following is a specification.

My invention is an improvement in steering-stands for steamboats and steamships and sailing and other vessels, and has for an object to support the compass conveniently in close proximity to the steering-wheel; and the invention consists, broadly, in a combined steering-stand and compass-support or binnacle; further, in a steering-stand provided with a wheel and with an extension above the wheel and the compass on said extension, the steering-wheel and compass being carried by the same stand, and, further, in a steering-stand provided with the steering-wheel and with the compass above and concentric with said wheel, all of which will be hereinafter described and claimed.

In the drawings, Figure 1 is a side view, and Fig. 2 a front elevation, of a stand embodying my invention; and Fig. 3 is a sectional top plan view thereof.

The steering-stand A is suitably located for the purpose and supports the wheel B, whose shaft C may be connected in any suitable manner with the rudder or with the devices for operating the same. Manifestly this connection may be a mechanical one, or the steering devices may be operated by the aid of compressed air, electricity, steam, or otherwise, as may be desired. The shaft C is shown in upright position, with the wheel B arranged horizontally.

For supporting the compass I provide the stand A with an extension A' above the wheel B and support the compass D upon such upward extension A' and arrange it concentrically with the wheel B. In forming the extension A', I provide the stand with the outwardly-bowed portions A², which extend around the wheel B at the front and rear thereof and operate to support the compass without interfering with the proper manipulation of the wheel B by the steersman standing in rear of the stand A.

From the foregoing it will be seen that the compass or binnacle is carried upon the same stand as the steering-wheel and is concentric therewith. Now this is important not only because it avoids the necessity of an independent binnacle-stand, but mainly because it supports the compass conveniently in position, so that bearings of any object that can be kept in sight can be taken at any angle, the compass being arranged in the position to which it is accessible at all times and which permits an accurate steering, as the helmsman is at all times in the center line of the ship, and the compass being directly over the wheel aids in the accuracy of the steering.

Manifestly the compass D and the binnacle-lamp D' may be of any desired construction.

From a practical standpoint the arrangement of the compass upon the steering-stand is of great importance, as it permits the helmsman to stand in the center line of the vessel at all times and to see the compass and lay the course without in any degree moving from said center-line position.

Having thus described my invention, what I claim, and desire to secure by Letters Patent, is—

1. A steering-stand provided with the steering-wheel and above the same with an extension and having the outwardly-bowed portions extending around the wheel and supporting such extension, and the compass arranged upon said upward extension, substantially as set forth.

2. A steering-stand provided with a wheel and having an extension above the wheel and the compass on said extension, the steering-wheel and compass being carried by the same stand, substantially as set forth.

3. A steering-stand provided with the steering-wheel and with the compass above and concentric with said wheel, substantially as set forth.

4. A steering-stand provided with means for supporting the steering-wheel and with means for supporting the compass, and the steering-wheel and compass carried by said stand substantially as set forth.

WALTER THOMAS STANWORTH.

Witnesses:
JOHN L. JACK,
JAMES G. PEAKE.